(12) United States Patent
Kadakia et al.

(10) Patent No.: US 11,334,465 B2
(45) Date of Patent: May 17, 2022

(54) LONG RUNNING WORKFLOWS FOR ROBOTIC PROCESS AUTOMATION

(71) Applicant: UiPath, Inc., New York, NY (US)

(72) Inventors: Palak Kadakia, Redmond, WA (US); Liji J. Kunnath, Bangalore (IN); Amol Awate, Bangalore (IN); Remus Rusanu, Redmond, WA (US)

(73) Assignee: UiPath, Inc., New York, NY (US)

( * ) Notice: Subject to any disclaimer, the term of this patent is extended or adjusted under 35 U.S.C. 154(b) by 250 days.

(21) Appl. No.: 16/716,860

(22) Filed: Dec. 17, 2019

(65) Prior Publication Data

US 2021/0117302 A1 Apr. 22, 2021

(30) Foreign Application Priority Data

Oct. 16, 2019 (IN) .............................. 201911041916

(51) Int. Cl.
| | |
|---|---|
| *G06F 11/00* | (2006.01) |
| *G06F 11/34* | (2006.01) |
| *G06F 9/455* | (2018.01) |
| *G06F 9/48* | (2006.01) |

(52) U.S. Cl.
CPC ...... *G06F 11/3476* (2013.01); *G06F 9/45512* (2013.01); *G06F 9/485* (2013.01); *G06F 11/3495* (2013.01)

(58) Field of Classification Search
CPC ................................................ G06F 11/3476
USPC ........................................................ 714/45
See application file for complete search history.

(56) References Cited

U.S. PATENT DOCUMENTS

| 8,375,389 | B2 | 2/2013 | Allen et al. |
| 9,754,231 | B2 | 9/2017 | Channabasavaiah et al. |
| 10,372,508 | B2 | 8/2019 | Hosabettu et al. |
| 10,599,722 | B1 | 3/2020 | Ewing et al. |
| 2005/0147054 | A1 | 7/2005 | Loo et al. |
| 2006/0279764 | A1 | 12/2006 | Shimada |
| 2009/0196512 | A1* | 8/2009 | Shelton ................. G06K 9/346 382/229 |
| 2010/0064357 | A1 | 3/2010 | Baird et al. |
| 2017/0270431 | A1 | 9/2017 | Hosabettu et al. |

(Continued)

FOREIGN PATENT DOCUMENTS

EP 1256900 A1 11/2002

OTHER PUBLICATIONS

Extended European Search Report dated Feb. 18, 2021, in connection with European Patent Application No. 20196352.7, filed Sep. 16, 2020, 11 pgs.

(Continued)

*Primary Examiner* — Timothy A Mudrick
(74) *Attorney, Agent, or Firm* — Chiesa Shahinian & Giantomasi PC (57) ABSTRACT

Systems and methods for executing a robotic process automation (RPA) workflow are provided. The RPA workflow is executed by a first robot. The execution of the RPA workflow is suspended by the first robot. A current context of the RPA workflow is serialized at a time of the suspension and the current context of the RPA workflow is stored. The execution of the RPA workflow is resumed by a second robot based on a triggering condition by retrieving the current context of the RPA workflow. The first robot and the second robot may be the same robot or different robots.

60 Claims, 8 Drawing Sheets

(56) References Cited

U.S. PATENT DOCUMENTS

| | | | |
|---|---|---|---|
| 2017/0352041 | A1 | 12/2017 | Ramamurthy et al. |
| 2018/0074931 | A1* | 3/2018 | Garcia ................ G06F 11/3476 |
| 2018/0232204 | A1 | 8/2018 | Ghatage et al. |
| 2018/0370033 | A1 | 12/2018 | Geffen et al. |
| 2019/0066013 | A1 | 2/2019 | Gupta et al. |
| 2019/0087395 | A1 | 3/2019 | Priestas et al. |
| 2019/0138596 | A1 | 5/2019 | Singh |
| 2019/0147382 | A1 | 5/2019 | Krishnamurthy |
| 2019/0155225 | A1 | 5/2019 | Kothandaraman et al. |
| 2019/0205636 | A1 | 7/2019 | Saraswat et al. |
| 2019/0286474 | A1* | 9/2019 | Sturtivant ................ G06F 9/451 |
| 2019/0286736 | A1 | 9/2019 | Sturtivant |
| 2019/0354720 | A1 | 11/2019 | Tucker et al. |
| 2020/0065334 | A1 | 2/2020 | Rodriguez et al. |
| 2020/0111023 | A1 | 4/2020 | Pondicherry et al. |
| 2020/0134524 | A1 | 4/2020 | Gentilhomme et al. |
| 2020/0180155 | A1 | 6/2020 | Hall |
| 2020/0233707 | A1 | 7/2020 | Ramamurthy et al. |
| 2021/0200523 | A1 | 7/2021 | Singh |
| 2021/0252704 | A1 | 8/2021 | Hall |
| 2021/0258389 | A1 | 8/2021 | Hall et al. |

OTHER PUBLICATIONS

"Long Running Workflow—Human Interaction," retrieved online on Aug. 30, 2019, at https://www.flexrule.com/process-automation/, 5 pgs.

"RPA—Robotics Automation Process," retrieved online on Aug. 29, 2019, at https://www.flexrule.com/robotics/?q=/rpa/&, 4 pgs.

"Managed ROC—Robotic Operations Center," Accelirate Inc., retrieved online on Aug. 29, 2019, at https://www.accelirate.com/wp-content/uploads/2019/01/Managed-ROC.pdf, 2 pgs.

"User Guide—Kryon Console v5.19," Kryon Systems Ltd., retrieved online on Aug. 29, 2019, at https://us.v-cdn.net/6030908/uploads/editor/8h/t3jiixqx97t2.pdf, 89 pgs.

"Understanding the RPA Monitor BOTs View," retrieved online on Aug. 29, 2019, at https://jacada.zendesk.com/hc/en-us/articles/360001675452, 5 pgs.

"Pega Robot Manager," Pegasystems, Inc., retrieved online on Sep. 9, 2019, at https://community.pega.com/marketplace/components/pega-robot-manager, 4 pgs.

"Intellibot RPA Platform," Uber Techlabs, retrieved online on Sep. 9, 2019, at https://intellibot.io/, 10 pgs.

"Robotic Process Automation (RPA)," NICE Robotic Automation, retrieved online on Sep. 5, 2019, at https://www.nice.com/websites/rpa/robotic-automation.html. 7 pgs.

YouTube Video "Power Your Document Processes with RPA," Kofax, Inc., uploaded on Nov. 8, 2018, initially retrieved online on Sep. 5, 2019, at https://www.youtube.com/watch?v=cvCxM2mYeCo, Digital Video, 1 pgs.

Non-Final Office Action dated Jun. 19, 2020, in connection with U.S. Appl. No. 16/654,653, filed Oct. 16, 2019, 20 pgs.

Non-Final Office Action dated Jun. 17, 2021, in connection with U.S. Appl. No. 17/075,726, filed Oct. 21, 2020, 43 pgs.

Notice of Allowance and Fee(s) Due dated Nov. 24, 2021, in connection with U.S. Appl. No. 17/075,726, filed Oct. 21, 2020, 14 pgs.

* cited by examiner

LONG RUNNING WORKFLOWS FOR ROBOTIC PROCESS AUTOMATION

CROSS-REFERENCE TO RELATED APPLICATIONS

This application is based upon and claims benefit of priority from Indian Patent Application Serial No. 201911041916, filed Oct. 16, 2019, the entire contents of which are incorporated herein by reference.

TECHNICAL FIELD

The present invention relates generally to robotic process automation, and more particularly to long running workflows for robotic process automation.

BACKGROUND

Robotic process automation (RPA) is a form of process automation that uses software robots to automate workflows. Typically, RPA is implemented for automating repetitive workflows that are completed within a relatively short period of time. Such workflows typically represent fragmented portions of a larger process. Often times, completion of a workflow depends on an external event, such as completion of another workflow, input from a user, a predetermined time delay, etc. Conventionally, in such a scenario, the robot executing the workflow must wait for the external event in order to complete the workflow, and is unable to perform other tasks until the workflow is completed. This conventional approach results in wastage of resources in the form of licensing cost per robot, power requirements, and computational resources.

In one example, completion of a workflow may depend on input from a user for handling, e.g., exceptions, validations, approvals, etc. A robot executing such a workflow must wait an uncertain period of time for the user input. The uncertain dependency on user intervention negatively impacts the performance and efficiency of robots.

BRIEF SUMMARY OF THE INVENTION

In accordance with one or more embodiments, systems and methods for executing a robotic process automation (RPA) workflow are provided. An RPA workflow being executed by a first robot may be suspended by the first robot and resumed by a second robot based on a triggering condition. The first and second robots may be the same or different robots.

In one embodiment, the triggering condition includes completion of another RPA workflow.

In one embodiment, the RPA workflow includes a robot activity and a human activity. A user request requesting user input for the user activity is generated and the user request is transmitted to a user. The triggering condition may include receipt of the user input for the user activity from the user. A notification indicating that user input for the user activity is requested may also be transmitted to the user. The user activity may include a validation activity or an approval activity.

In one embodiment, suspending the execution of the RPA workflow by the first robot includes serializing a current context of the RPA workflow at a time of the suspending and storing the current context of the RPA workflow, and resuming the execution of the RPA workflow by a second robot includes retrieving the current context of the RPA workflow.

In one embodiment, a log that records states of the RPA workflow is maintained.

These and other advantages of the invention will be apparent to those of ordinary skill in the art by reference to the following detailed description and the accompanying drawings.

DETAILED DESCRIPTION

Figure 1:
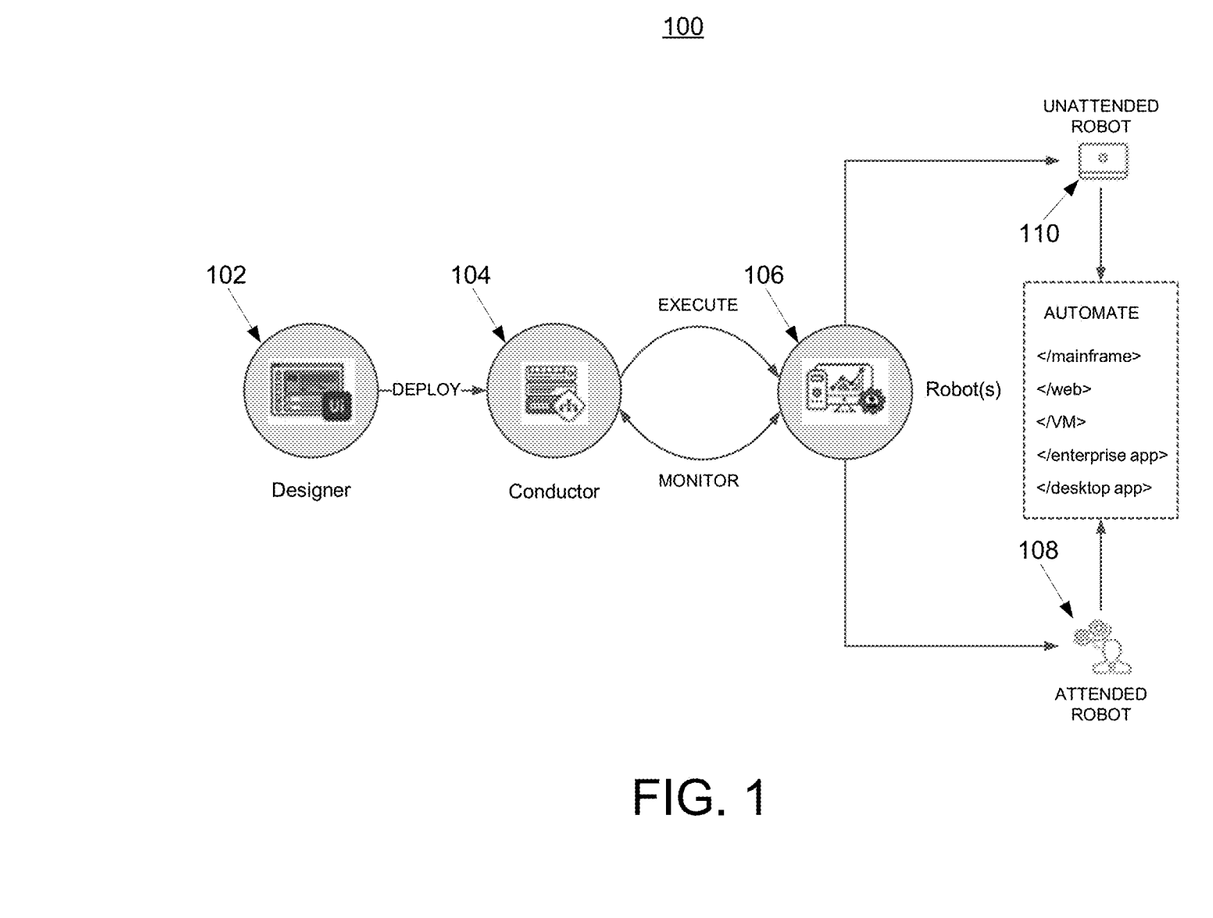
FIG. 1 is an architectural diagram illustrating a robotic process automation system, according to an embodiment of the invention.

Robotic process automation (RPA) is used for automating workflows. FIG. 1 is an architectural diagram of an RPA system 100, in accordance with one or more embodiments. As shown in FIG. 1, RPA system 100 includes a designer 102 to allow a developer to design automation processes using workflows. More specifically, designer 102 facilitates the development and deployment of workflows and robots for performing activities in the workflows. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a workflow, defined herein as "activities." Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 102, execution of business processes is orchestrated by a conductor 104, which orchestrates one or more robots 106 that execute the workflows developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run workflows built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
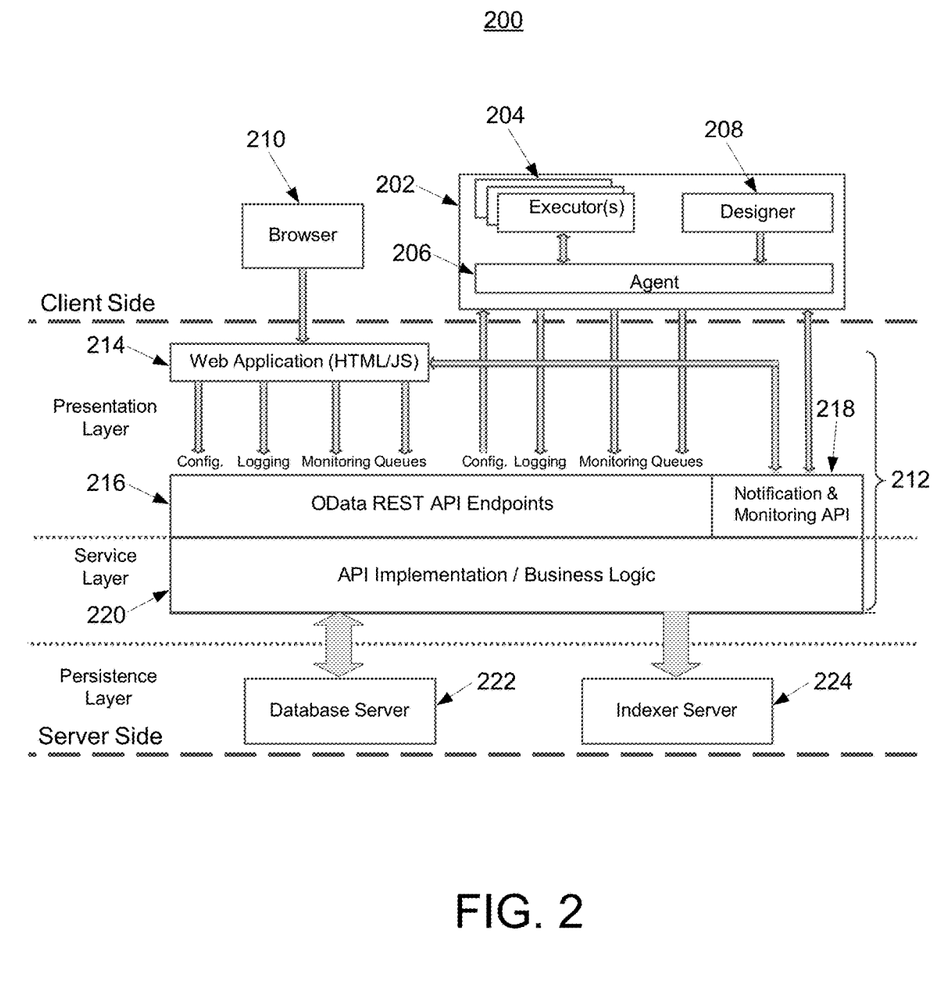
FIG. 2 is an architectural diagram illustrating an example of a deployed robotic process automation system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
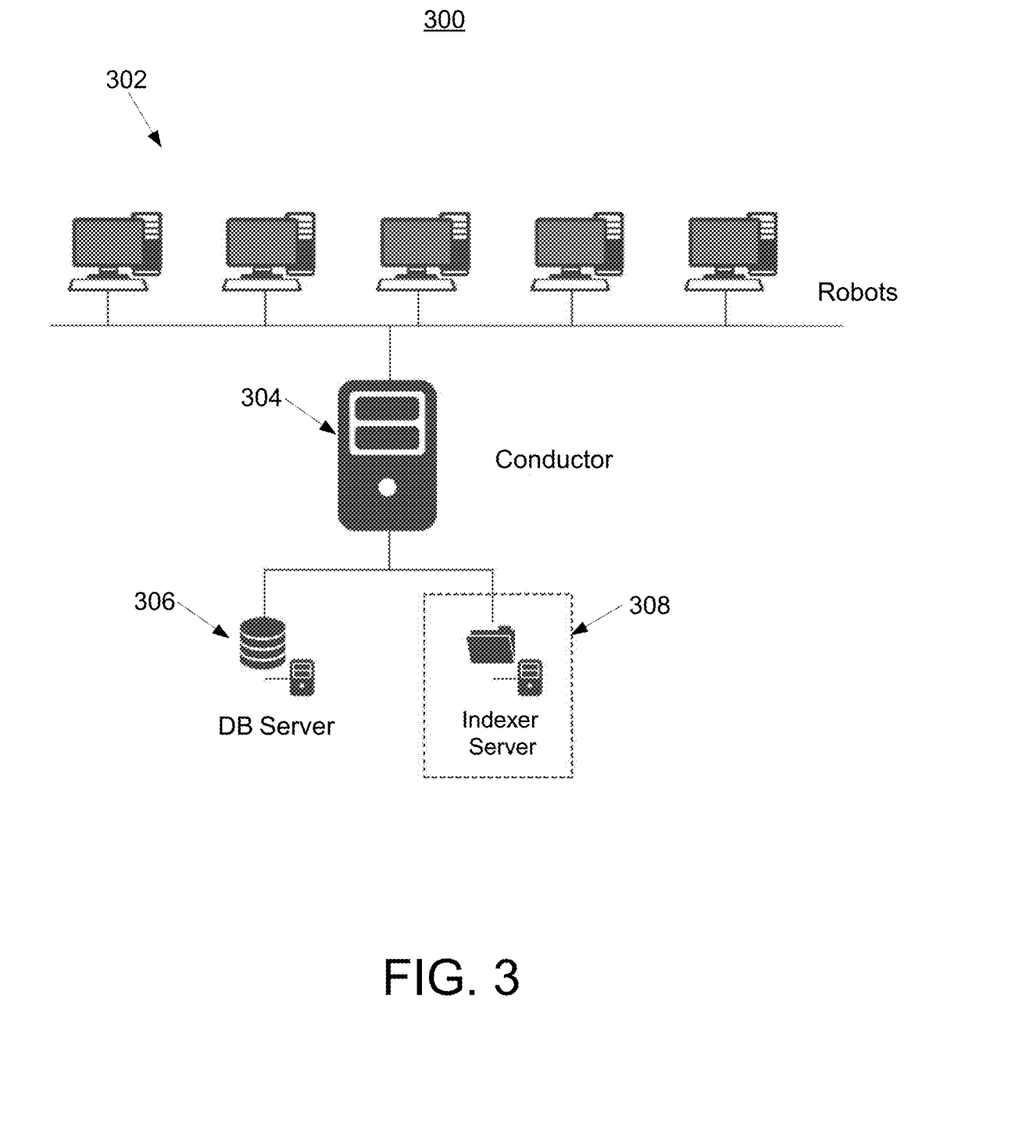
FIG. 3 is an architectural diagram illustrating a simplified deployment example of a robotic process automation system, according to an embodiment of the invention.

FIG. 3 is an architectural diagram illustrating a simplified deployment example of RPA system 300, in accordance with one or more embodiments. In some embodiments, RPA system 300 may be, or may include RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

In one embodiment, RPA system 300 may be implemented to execute long running workflows. As used herein, long running workflows are workflows that include one or more activities that depend on an occurrence of an external event in order to complete the activity. An external event of a particular long running workflow is any event that does not result from execution of the particular long running workflow. The external event may include, for example, a completion of another workflow, receiving input from a user, a predetermined period of time, or any other suitable event. Long running workflows are performed over a relatively long period of time (e.g., hours or days) and may be suspended and resumed at any point in time to wait for the occurrence of the external event, thereby providing long running behavior to the workflow. In contrast, activities of non-long running workflows are executed in a continuous manner without waiting for external events.

Figure 4A:
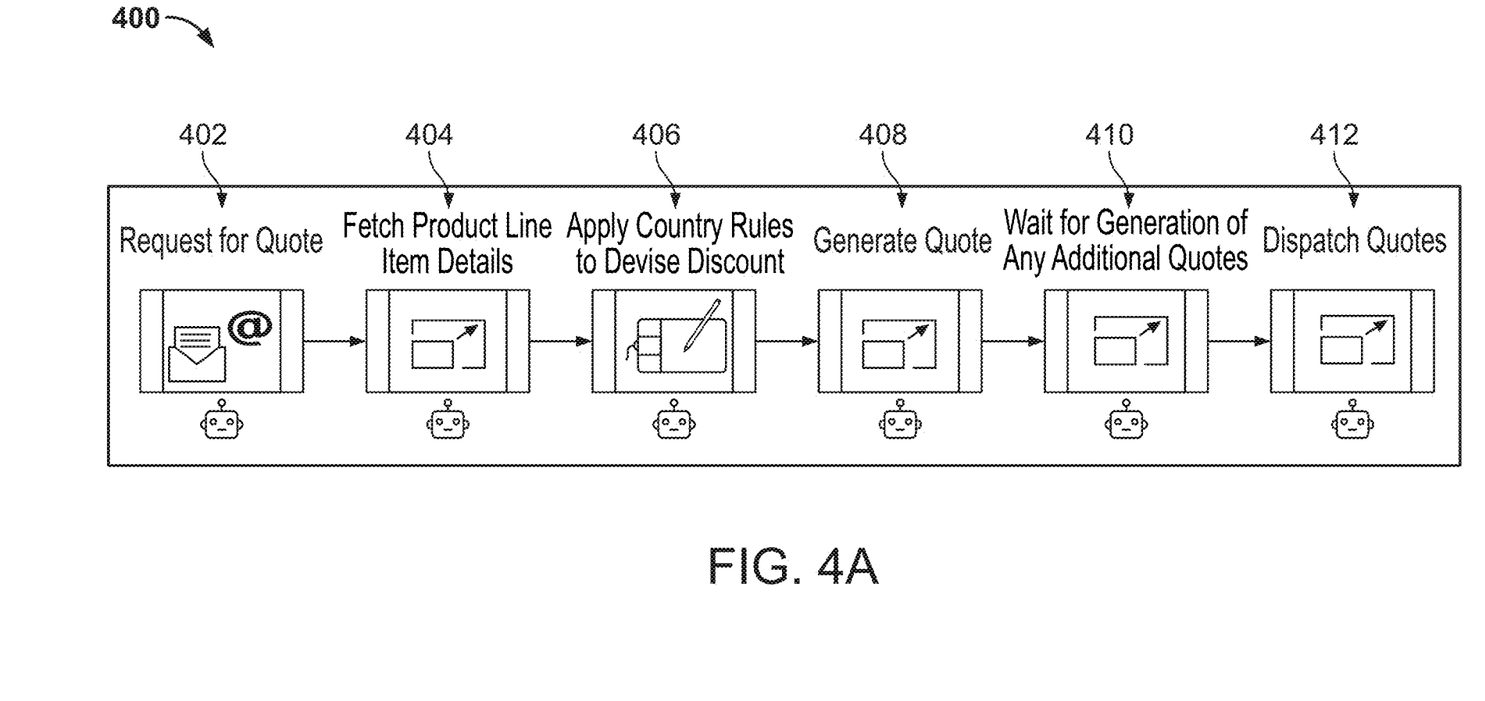
FIG. 4A shows a long running workflow for generating and dispatching quotes, according to an embodiment of the invention.

FIG. 4A shows an exemplary long running workflow 400 for generating and dispatching quotes, in accordance with one or more embodiments. Long running workflow 400 comprises robot activities 402-412. Activity 402 defines a robot requesting a quote. Activity 404 defines a robot fetching product line item details. Activity 406 defines a robot applying country rules to devise a discount. Activity 408 defines a robot generating a quote based on the discount. Activity 410 defines a robot waiting for the generation of any additional quotes. Activity 412 defines a robot dispatches the quotes.

In long running workflow 400, activity 410 depends on the occurrence of the external event of generating additional quotes, which is performed by other workflows. Execution of long running workflow 400 may be suspended while waiting for the generation of the additional quotes and may be resumed once the additional quotes are generated. The robot executing long running workflow 400 may be assigned to execute another workflow when execution of long running workflow 400 is suspended, thereby optimizing resources. Execution of long running workflow 400 may be resumed at activity 412 upon completion of activity 410 with a same or a different robot.

Figure 4B:
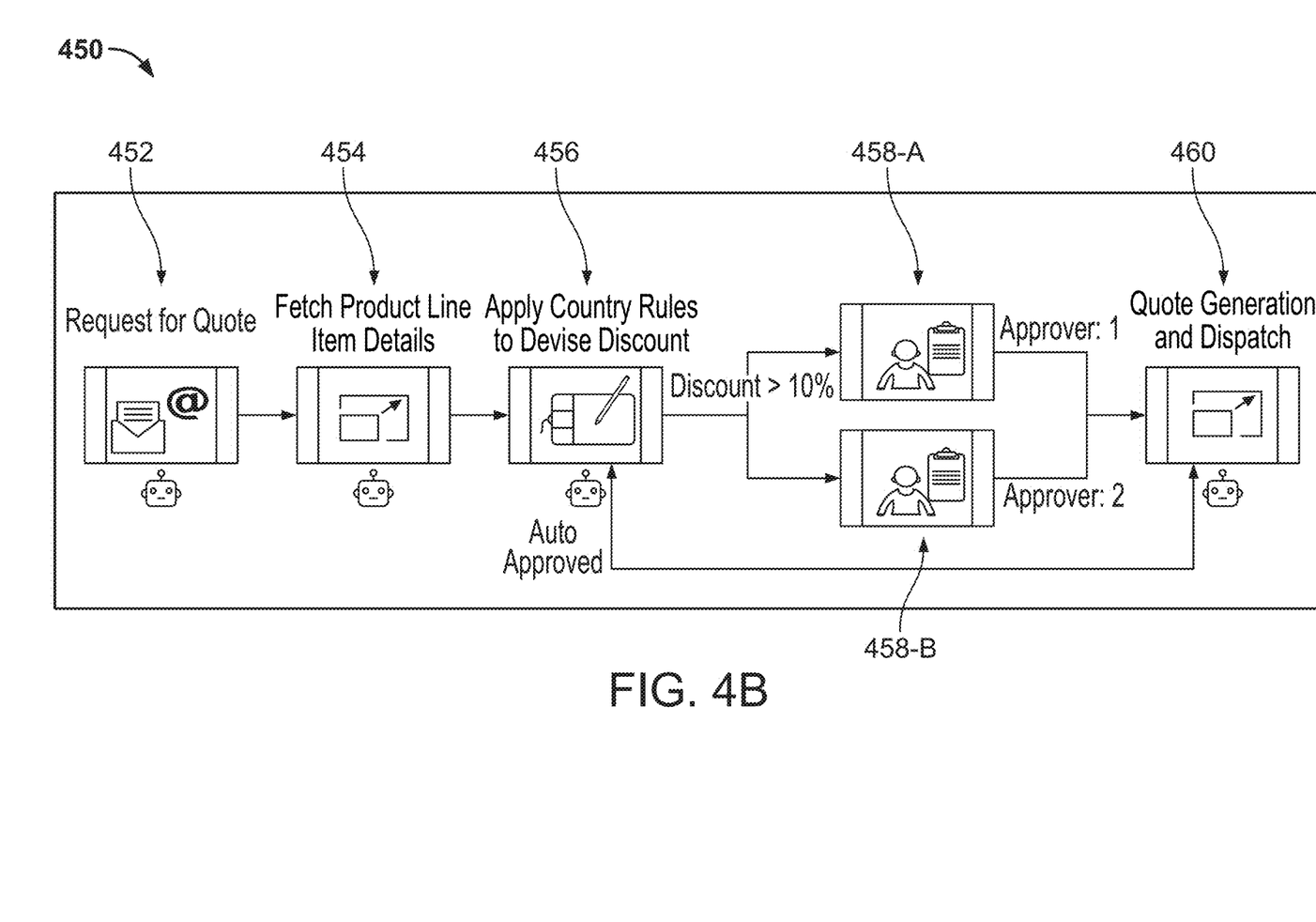
FIG. 4B shows a long running workflow requiring user intervention for generating and dispatching a quote, according to an embodiment of the invention.

FIG. 4B shows an exemplary long running workflow 450 requiring user intervention for generating and dispatching a quote, in accordance with one or more embodiments. Long running workflow 450 comprises robot activities 452, 454, 456, and 460 and user activities 458-A and 458-B. User activities refer to activities of a workflow performed by a user.

Activity 452 defines a robot requesting a quote. Activity 454 defines a robot fetching product line item details. Activity 456 defines a robot applying country rules to devise a discount. If the discount is greater than 10%, long running workflow 450 proceeds to activities 458-A and 458-B for receiving approval from end users (e.g., approver 1 and approver 2, respectively) for the discount. If the discount is approved for activities 458-A and 458-B or if the discount is not greater than 10% (such that the discount is auto approved) at activity 456, a quote is generated and dispatched at activity 460.

In long running workflow 450, activities 458-A and 458-B depend on the occurrence of the external event of receiving approval, which is performed by users. Execution of long running workflow 450 may be suspended while waiting for user intervention approving the discount and may be resumed once the discount has been approved. The robot executing long running workflow 450 may be assigned to execute another workflow when execution of long running workflow 450 is suspended, thereby optimizing resources. Execution of long running workflow 450 may be resumed at activity 460 upon completion of activities 458-A and 458-B with a same or a different robot.

Long running workflows, such as, e.g., long running workflow 400 of FIG. 4A and long running workflow 450 of FIG. 4B, may be created by a user (e.g., an RPA developer) using, e.g., designer 102 of FIG. 1 or designer 208 of FIG. 2. For example, the user may interact with designer 102 or designer 208 to stitch together multiple fragmented activities (including fragmented shorter running workflows) to create a long running workflow. In one embodiment, the user creates the long running workflow by creating a new project (e.g., in designer 102 of FIG. 1 or designer 208 of FIG. 2) and selecting (e.g., dragging and dropping from a set of available activities and/or workflows) activities.

Figure 5:
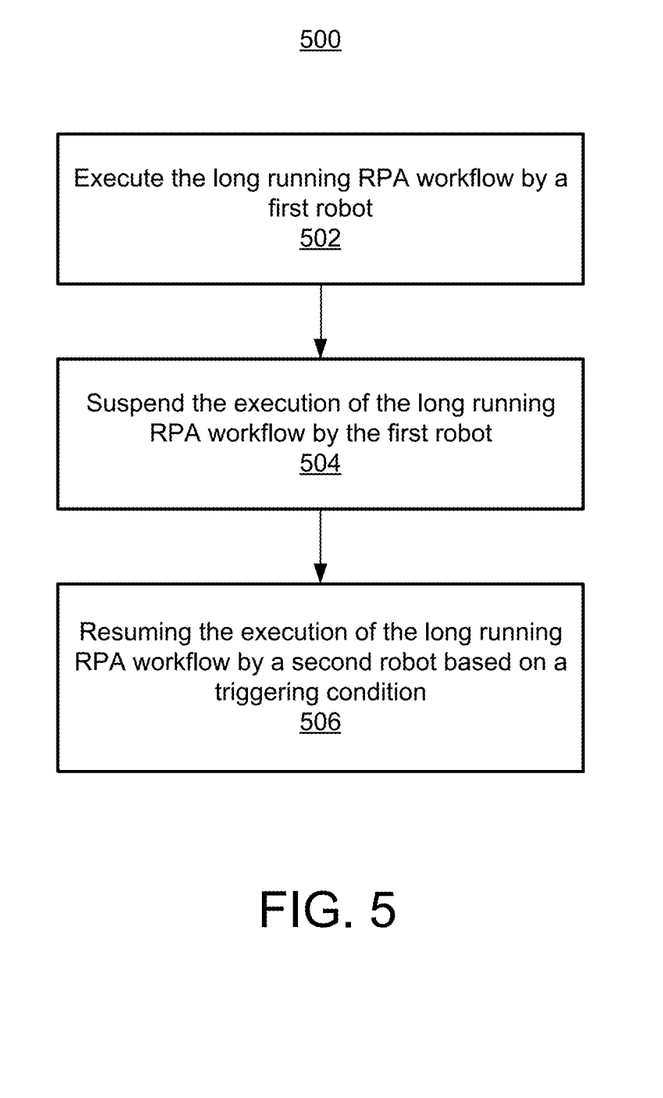
FIG. 5 shows a flowchart of a method for executing a long running workflow, according to an embodiment of the invention.

FIG. 5 shows a method 500 for executing a long running RPA workflow, in accordance with one or more embodiments. The steps of method 500 may be performed by one or more robots (e.g., attended robot 108 or unattended robot 110 of FIG. 1 or robots 302 of FIG. 3) running on a computing device (e.g., computing system 700 of FIG. 7). Method 500 is for executing a long running workflow that does not include a user activity, such as, e.g., long running workflow 400 of FIG. 4A.

At step 502, the long running workflow is executed by a first robot. In one embodiment, one or more robot activities of the long running workflow are executed by the first robot at step 502. For example, robot activities of steps 402-408 of long running workflow 400 of FIG. 4A may be executed by the first robot.

At step 504, the execution of the long running workflow is suspended by the first robot. In one embodiment, execution of the long running workflow may be suspended to wait for an external event. In one example, the external event may be waiting for the completion of a robot activity, such as, e.g., completion of another workflow by another robot. For instance, the external event may be waiting for completion of the robot activity 410 of long running workflow 400 of FIG. 4A. In another example, the external event may be based on a time, such as, e.g., waiting for a certain time of the day or waiting for a predetermined period of time. Execution of the long running workflow may be suspended at any time during the long running workflow, such as, e.g., during performance of an activity of the long running workflow or between activities of the long running workflow. In one embodiment, suspension of the long running workflow is defined by the activity of the long running workflow that the first robot is executing. The long running workflow may be suspended by setting the state of the long running workflow to idle.

In one example, one or more activities of the long running workflow may indicate to wait for the completion of one or more other workflows. In this example, a first activity of the long running workflow may instruct an executing robot to transmit a triggering instruction to an orchestrator (e.g., conductor 104 of FIG. 1, conductor 212 of FIG. 2, or conductor 304 of FIG. 3) coordinating execution of workflows to trigger the one or more other workflows and to retrieve a job ID (e.g., Job 10) associated with the one or more other workflows from the orchestrator. A second activity may instruct the executing robot to suspend the long running workflow and record a triggering condition defining when the long running workflow is to be resumed (e.g., upon completion of Job 10). The executing robot will transmit the triggering condition to the orchestrator.

In another example, an activity of the long running workflow may indicate to wait for a predetermined period of time. In this example, the activity may instruct an executing robot to suspend the long running workflow and record a triggering condition defining when the long running workflow is to be resumed (e.g., the time at which the long running workflow is to be resumed). The executing robot will transmit the triggering condition to the orchestrator.

At step 506, the execution of the long running workflow is resumed by a second robot based on a triggering condition. For example, the execution of the long running workflow 400 of FIG. 4A may be resumed by executing the robot activity of step 412. The triggering condition may be any suitable triggering condition for resuming the long running workflow. The triggering condition may be based on the conditions that caused the long running workflow to be suspended. For example, where the long running workflow was suspended to wait for the completion of a robot activity (at step 504), the triggering condition may be the completion of the robot activity (e.g., robot activity 410 of FIG. 4A). In another example, where the long running workflow was suspended to wait for a predetermined period of time (at step 504), the triggering condition may be that the predetermined period of time is reached.

Figure 6:
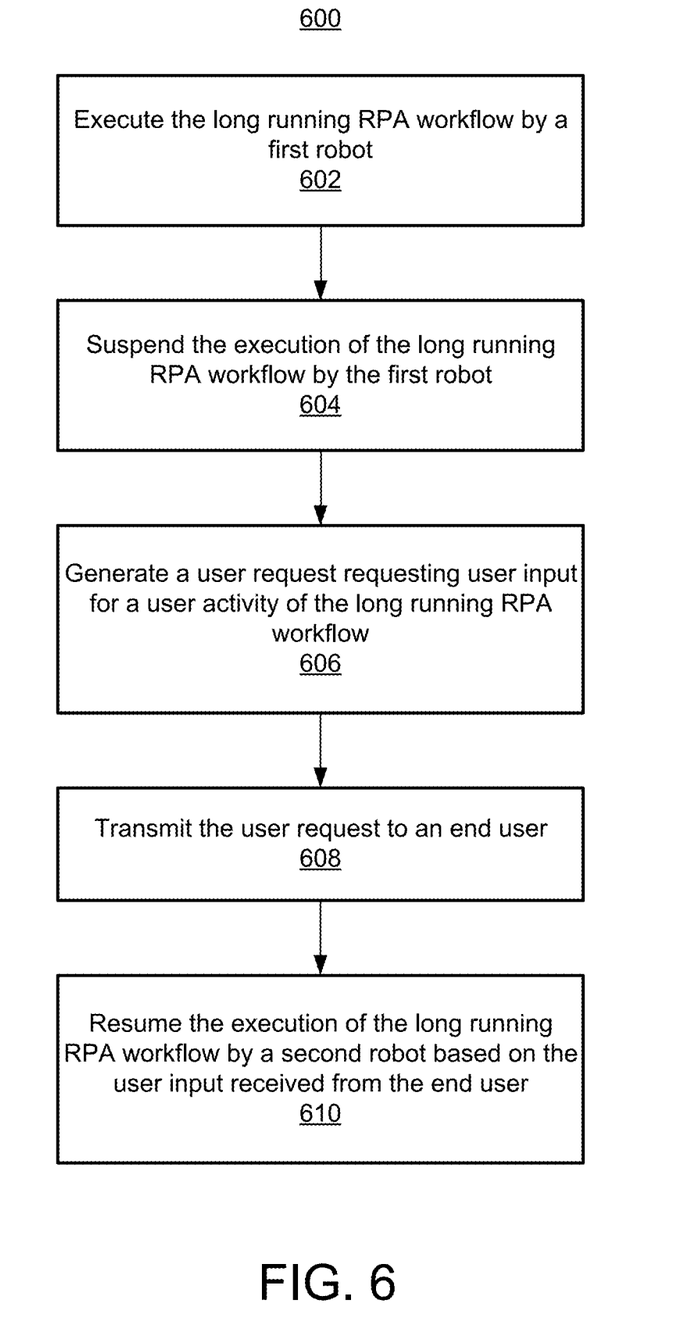
FIG. 6 shows a flowchart of a method for executing a long running workflow requiring user intervention, according to an embodiment of the invention.

FIG. 6 shows a method 600 for executing a long running workflow requiring user intervention, in accordance with one or more embodiments. Such a long running workflow comprises one or more robot activities stitched together with one or more user activities. The user activity inserts user intervention into the long running workflow. The steps of method 600 may be performed by one or more robots (e.g., attended robot 108 or unattended robot 110 of FIG. 1 or robots 302 of FIG. 3) running on a computing device (e.g., computing system 700 of FIG. 7). Method 600 will be described with reference to long running workflow 450 of FIG. 4B.

At step 602, the long running workflow is executed by a first robot. In one embodiment, one or more robot activities of the long running workflow are executed by the first robot at step 602. For example, long running workflow 450 of FIG. 4B may be executed by executing robot activities 452, 454, and 546.

At step 604, the execution of the long running workflow is suspended by the first robot. The suspension may be in response to one or more user activities. For example, execution of long running workflow 450 of FIG. 4B may be suspended in response to user activities 458-A and 458-B in FIG. 4B. An exemplary user activity includes approval and validation of a document processing activity by an end user.

At step 606, a user request requesting user input for a user activity of the long running workflow is generated. In one embodiment, the user request may be a visualization of the user activity. The visualization may be generated by the first robot as a user interface enabling an end user to provide user input (e.g., approve or disapprove). The visualization may be customized via forms to provide a different visualization for different workflows and for different user activities within the workflow. The forms are generated at the time of creating the workflow. In particular, a user creating the workflow may define a title and priority for the workflow, as well as map workflow variables to be passed to activities of the workflow as data. A form defining visualizations (e.g., layout of data) may be defined using the mapped workflow variables. The form may be customized based on the activity of the workflow. The form will be rendered for each task to generate the visualization.

In one embodiment, a notification indicating that user input for the user activity is requested is also transmitted to the end user. The notification may include a link, or otherwise direct the end user to, the visualization to enable the end user to provide user input. The notification may be a mobile device notification, text message, email, etc.

At step 608, the user request is transmitted to an end user. In one embodiment, the end user receives a notification upon receiving the user request. As such, the end user no longer has to monitor the status of the long running workflow.

At step 610, the execution of the long running workflow is resumed by a second robot based on the user input received from the end user. For example, the long running workflow 450 of FIG. 4B may be resumed by the second robot executing robot activity 460 based on user input from Approver 1 and Approver 2 (e.g., approving the discount).

With reference to method 500 of FIG. 5 and method 600 of FIG. 6, the first robot and the second robot may be any suitable robot for executing RPA workflows. In one embodiment, the first robot and the second robot are unattended robots. The first robot and the second robot may be the same robot or different robots. In one embodiment, the second robot is the first available robot in a robot pool associated with the long running workflow. The activities of the long running workflow may include any suitable activity for RPA that is serializable. The activities may be invoked in an asynchronous non-blocking manner. In one embodiment, the activities include non-UI activities that may be invoked in a synchronous blocking manner or in an asynchronous blocking manner. Non-UI activities may include, for example, calls to external systems (e.g., an API call to an SAP (Systems Applications and Products) system to retrieve data). The calls may be executed in an asynchronous manner, meaning that the call to the API is performed and the handling of the returned data is defined at the same time, and the thread proceeds with other logic. A synchronous call, on the other hand, executes the call, waits and blocks the thread until the data is received, and then proceeds with the data handling.

To suspend the execution of the long running workflow at step 504 of method 500 and step 604 of method 600, the current context of the long running workflow at the time of suspension is serialized. Serialization of the current context of the long running workflow refers to the process of translating the current state of the long running workflow (data variables and their values) into a format that can be stored and later reconstructed. The current context of the long running workflow is stored in a central persistent storage, such as, e.g., database server 222 of FIG. 2 or database server 306 of FIG. 3. Execution of the long running workflow is resumed at step 506 of method 500 and step 610 of method 600 by retrieving the current context of the long running workflow from the central persistent storage (e.g., database server 222 of FIG. 2 or database server 306 of FIG. 3). Accordingly, even if the long running workflow was later updated or modified (e.g., after suspension of the execution of the long running workflow), execution of the long running workflow is resumed using the workflow state (data variables and their values) at the time of suspension, which was stored in the central persistent storage.

The long running workflows may be suspended any number of instances. Accordingly, method 500 may iterate by returning to step 504 and method 600 may iterate by returning to step 604 each time the resumed long running workflow is suspended until execution of the long running workflow is complete.

While the steps of methods 500 and 600 may be performed by one or more robots, coordination of those steps are managed by an orchestrator, such as, e.g., conductor 104 of FIG. 1, conductor 212 of FIG. 2, or conductor 304 of FIG. 3. Specifically, with respect to method 500, the orchestrator transmits an indication to execute the long running workflow to the first robot to perform step 502, transmits an indication to suspend the execution of the long running workflow to the first robot to perform step 504, determines whether the triggering condition is satisfied, and if the triggering condition is satisfied, transmits an indication to resume the execution of the long running workflow to the second robot. In one embodiment, the orchestrator determines whether the triggering condition is satisfied by receiving call backs from activities and/or workflows indicating that the activity and/or workflow is complete. With respect to method 600, the orchestrator transmits an indication to execute the long running workflow to the first robot to perform step 602, transmits an indication to suspend the execution of the long running workflow to the first robot to perform step 604, receives the generated user request from the robot and transmits the generated user request to the end user, receives user input from the end user in response to the user request, and transmits an indication to resume the execution of the long running workflow to the second robot. Accordingly, the long running workflow is coordinated in a centralized manner by the orchestrator but may be executed in a decentralized manner by different robots.

To enable long running behavior of the long running workflow described with respect to methods 500 and 600, the orchestrator maintains a log of the long running workflow recording states of the long running workflow as the long running workflow is executed from start to completion. The states may include, for example, suspension and resumption of the execution of the long running workflow, the reason for suspension of the execution of the long running workflow, triggering conditions that are satisfied to resume the execution of the long running workflow, and any other suitable information. The log of the long running workflow is maintained using a job identifier (ID) to track with the long running workflow.

Advantageously, the suspending and resuming of long running workflows allows for optimal resource allocation for performing the long running workflows without the need for continuous monitoring or waiting by a robot.

Figure 7:
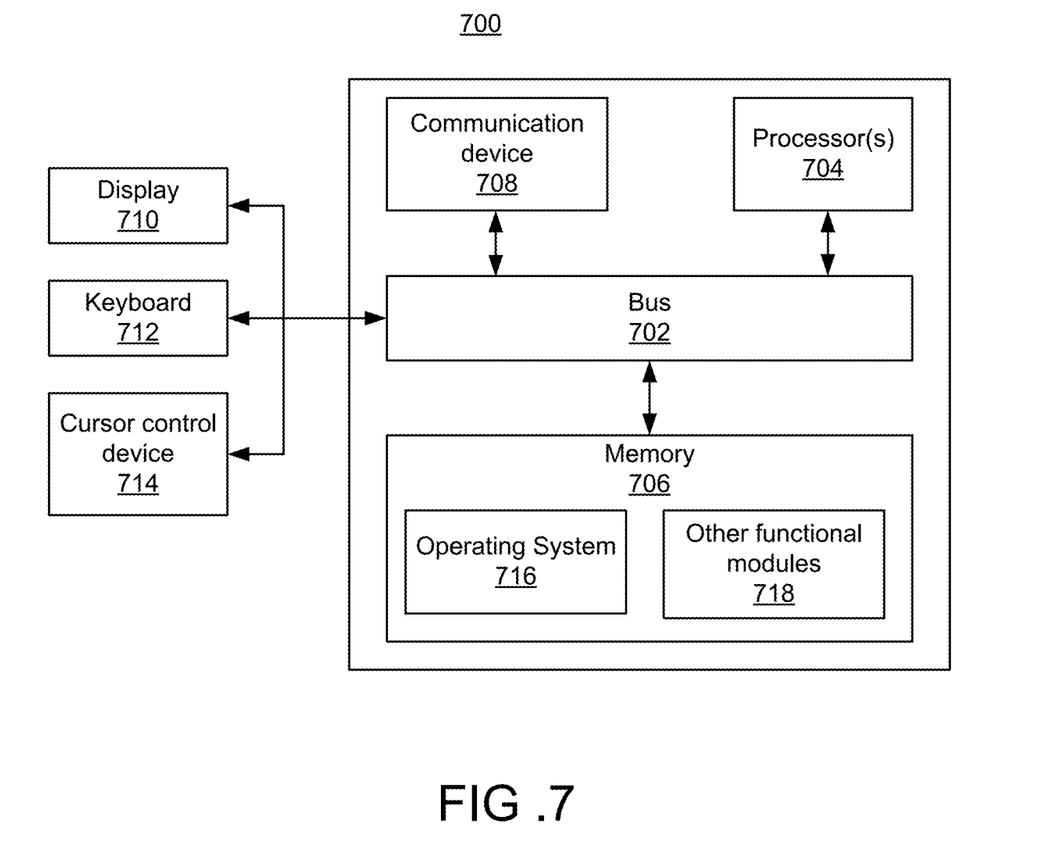
FIG. 7 is a block diagram of a computing system according to an embodiment of the invention.

FIG. 7 is a block diagram illustrating a computing system 700 configured to execute the methods described in reference to FIG. 4, according to an embodiment of the present invention. In some embodiments, computing system 700 may be one or more of the computing systems depicted and/or described herein. Computing system 700 includes a bus 702 or other communication mechanism for communicating information, and processor(s) 704 coupled to bus 702 for processing information. Processor(s) 704 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 704 may also have multiple processing cores, and at least some of the cores may be configured to perform specific functions. Multi-parallel processing may be used in some embodiments.

Computing system 700 further includes a memory 706 for storing information and instructions to be executed by processor(s) 704. Memory 706 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 704 and may include volatile media, non-volatile media, or both. The media may also be removable, non-removable, or both.

Additionally, computing system 700 includes a communication device 708, such as a transceiver, to provide access to a communications network via a wireless and/or wired connection according to any currently existing or future-implemented communications standard and/or protocol.

Processor(s) 704 are further coupled via bus 702 to a display 710 that is suitable for displaying information to a user. Display 710 may also be configured as a touch display and/or any suitable haptic I/O device.

A keyboard 712 and a cursor control device 714, such as a computer mouse, a touchpad, etc., are further coupled to bus 702 to enable a user to interface with computing system. However, in certain embodiments, a physical keyboard and mouse may not be present, and the user may interact with the device solely through display 710 and/or a touchpad (not shown). Any type and combination of input devices may be used as a matter of design choice. In certain embodiments, no physical input device and/or display is present. For instance, the user may interact with computing system 700 remotely via another computing system in communication therewith, or computing system 700 may operate autonomously.

Memory 706 stores software modules that provide functionality when executed by processor(s) 704. The modules include an operating system 716 for computing system 700 and one or more additional functional modules 718 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method for executing a robotic process automation (RPA) workflow comprising:
   executing the RPA workflow by a first robot;
   suspending the execution of the RPA workflow by the first robot, wherein suspending the execution of the RPA workflow by the first robot comprises:
      serializing a current context of the RPA workflow at a time of the suspending, and
      storing the current context of the RPA workflow; and
   resuming the execution of the RPA workflow by a second robot based on a triggering condition, wherein resuming the execution of the RPA workflow by a second robot comprises:
      retrieving the current context of the RPA workflow.

2. The computer-implemented method of claim 1, wherein the triggering condition comprises completion of another RPA workflow.

3. The computer-implemented method of claim 1, wherein the RPA workflow comprises a robot activity and a user activity.

4. The computer-implemented method of claim 3, further comprising:
   generating a user request requesting user input for the user activity; and
   transmitting the user request to a user.

5. The computer-implemented method of claim 4, wherein the triggering condition comprises receipt of the user input for the user activity from the user.

6. The computer-implemented method of claim 3, further comprising:
   transmitting a notification to a user indicating that user input for the user activity is requested.

7. The computer-implemented method of claim 3, wherein the user activity comprises at least one of a validation activity or an approval activity.

8. The computer-implemented method of claim 1, further comprising:
   maintaining a log recording states of the RPA workflow.

9. The computer-implemented method of claim 1, wherein the first robot and the second robot are the same robot.

10. The computer-implemented method of claim 1, wherein the first robot and the second robot are different robots.

11. A system for executing a robotic process automation (RPA) workflow comprising:
   a memory storing computer instructions; and
   at least one processor configured to execute the computer instructions, the computer instructions configured to cause the at least one processor to perform operations of:
      executing the RPA workflow by a first robot;
      suspending the execution of the RPA workflow by the first robot, wherein suspending the execution of the RPA workflow by the first robot comprises:
         serializing a current context of the RPA workflow at a time of the suspending, and
         storing the current context of the RPA workflow; and
      resuming the execution of the RPA workflow by a second robot based on a triggering condition, wherein resuming the execution of the RPA workflow by a second robot comprises:
         retrieving the current context of the RPA workflow.

12. The system of claim 11, wherein the triggering condition comprises completion of another RPA workflow.

13. The system of claim 11, wherein the RPA workflow comprises a robot activity and a user activity.

14. The system of claim 13, the operations further comprising:
   generating a user request requesting user input for the user activity; and
   transmitting the user request to a user.

15. The system of claim 14, wherein the triggering condition comprises receipt of the user input for the user activity from the user.

16. The system of claim 13, the operations further comprising:
   transmitting a notification to a user indicating that user input for the user activity is requested.

17. The system of claim 13, wherein the user activity comprises at least one of a validation activity or an approval activity.

18. The system of claim 11, the operations further comprising:
   maintaining a log recording states of the RPA workflow.

19. The system of claim 11, wherein the first robot and the second robot are the same robot.

20. The system of claim 11, wherein the first robot and the second robot are different robots.

21. A non-transitory computer readable medium storing computer program instructions for executing a robotic process automation (RPA) workflow, the computer program instructions when executed by at least one processor cause the at least one processor to perform operations comprising:
   executing the RPA workflow by a first robot;
   suspending the execution of the RPA workflow by the first robot, wherein suspending the execution of the RPA workflow by the first robot comprises:
      serializing a current context of the RPA workflow at a time of the suspending, and
      storing the current context of the RPA workflow; and
   resuming the execution of the RPA workflow by a second robot based on a triggering condition, wherein resuming the execution of the RPA workflow by a second robot comprises:
      retrieving the current context of the RPA workflow.

22. The non-transitory computer readable medium of claim 21, wherein the triggering condition comprises completion of another RPA workflow.

23. The non-transitory computer readable medium of claim 21, wherein the RPA workflow comprises a robot activity and a user activity.

24. The non-transitory computer readable medium of claim 23, the operations further comprising:
   generating a user request requesting user input for the user activity; and
   transmitting the user request to a user.

25. The non-transitory computer readable medium of claim 24, wherein the triggering condition comprises receipt of the user input for the user activity from the user.

26. The non-transitory computer readable medium of claim 23, the operations further comprising:
   transmitting a notification to a user indicating that user input for the user activity is requested.

27. The non-transitory computer readable medium of claim 23, wherein the user activity comprises at least one of a validation activity or an approval activity.

28. The non-transitory computer readable medium of claim 21, the operations further comprising:
   maintaining a log recording states of the RPA workflow.

29. The non-transitory computer readable medium of claim 21, wherein the first robot and the second robot are the same robot.

30. The non-transitory computer readable medium of claim 21, wherein the first robot and the second robot are different robots.

31. A computer-implemented method for executing a robotic process automation (RPA) workflow comprising:
executing the RPA workflow by a first robot;
suspending the execution of the RPA workflow by the first robot; and
resuming the execution of the RPA workflow by a second robot based on a triggering condition,
wherein the executing, the suspending, and the resuming are performed by one or more computing devices implemented in a cloud computing system.

32. A system for executing a robotic process automation (RPA) workflow comprising:
a memory storing computer instructions; and
at least one processor configured to execute the computer instructions, the computer instructions configured to cause the at least one processor to perform operations of:
executing the RPA workflow by a first robot;
suspending the execution of the RPA workflow by the first robot; and
resuming the execution of the RPA workflow by a second robot based on a triggering condition,
wherein the system is implemented in a cloud computing system.

33. A non-transitory computer readable medium storing computer program instructions for executing a robotic process automation (RPA) workflow, the computer program instructions when executed by at least one processor cause the at least one processor to perform operations comprising:
executing the RPA workflow by a first robot;
suspending the execution of the RPA workflow by the first robot; and
resuming the execution of the RPA workflow by a second robot based on a triggering condition,
wherein the at least one processor is implemented in one or more computing devices and the one or more computing devices are implemented in a cloud computing system.

34. The computer-implemented method of claim 31, wherein the triggering condition comprises completion of another RPA workflow.

35. The computer-implemented method of claim 31, wherein the RPA workflow comprises a robot activity and a user activity.

36. The computer-implemented method of claim 35, further comprising:
generating a user request requesting user input for the user activity; and
transmitting the user request to a user.

37. The computer-implemented method of claim 36, wherein the triggering condition comprises receipt of the user input for the user activity from the user.

38. The computer-implemented method of claim 35, further comprising:
transmitting a notification to a user indicating that user input for the user activity is requested.

39. The computer-implemented method of claim 35, wherein the user activity comprises at least one of a validation activity or an approval activity.

40. The computer-implemented method of claim 31, further comprising:
maintaining a log recording states of the RPA workflow.

41. The computer-implemented method of claim 31, wherein the first robot and the second robot are the same robot.

42. The computer-implemented method of claim 31, wherein the first robot and the second robot are different robots.

43. The system of claim 32, wherein the triggering condition comprises completion of another RPA workflow.

44. The system of claim 32, wherein the RPA workflow comprises a robot activity and a user activity.

45. The system of claim 44, further comprising:
generating a user request requesting user input for the user activity; and
transmitting the user request to a user.

46. The system of claim 45, wherein the triggering condition comprises receipt of the user input for the user activity from the user.

47. The system of claim 44, further comprising:
transmitting a notification to a user indicating that user input for the user activity is requested.

48. The system of claim 44, wherein the user activity comprises at least one of a validation activity or an approval activity.

49. The system of claim 32, further comprising:
maintaining a log recording states of the RPA workflow.

50. The system of claim 32, wherein the first robot and the second robot are the same robot.

51. The system of claim 32, wherein the first robot and the second robot are different robots.

52. The non-transitory computer readable medium of claim 36, wherein the triggering condition comprises completion of another RPA workflow.

53. The non-transitory computer readable medium of claim 36, wherein the RPA workflow comprises a robot activity and a user activity.

54. The non-transitory computer readable medium of claim 53, further comprising:
generating a user request requesting user input for the user activity; and
transmitting the user request to a user.

55. The non-transitory computer readable medium of claim 54, wherein the triggering condition comprises receipt of the user input for the user activity from the user.

56. The non-transitory computer readable medium of claim 53, further comprising:
transmitting a notification to a user indicating that user input for the user activity is requested.

57. The non-transitory computer readable medium of claim 53, wherein the user activity comprises at least one of a validation activity or an approval activity.

58. The non-transitory computer readable medium of claim 33, further comprising:
maintaining a log recording states of the RPA workflow.

59. The non-transitory computer readable medium of claim 33, wherein the first robot and the second robot are the same robot.

60. The non-transitory computer readable medium of claim 33, wherein the first robot and the second robot are different robots.

* * * * *